United States Patent [19]

Marincic et al.

[11] 4,007,054
[45] Feb. 8, 1977

[54] ELECTRIC CELL WITH ZINC COIL ANODE AND METHOD OF MAKING IT

[75] Inventors: Nikola Marincic, Winchester, Mass.; Ronald Merz, Cleveland, Tenn.; Robert H. Kelsey, Acton, Mass.

[73] Assignee: P. R. Mallory & Co., Inc., Indianapolis, Ind.

[22] Filed: Jan. 21, 1976

[21] Appl. No.: 651,377

Related U.S. Application Data

[63] Continuation of Ser. No. 204,062, Dec. 2, 1971, abandoned.

[52] U.S. Cl. .................................. 429/206; 429/230
[51] Int. Cl.² ...................................... H01M 35/04
[58] Field of Search ............... 136/13, 74, 30–37, 136/95, 102, 125, 130, 75, 68, 69, 20, 14

[56] References Cited
UNITED STATES PATENTS

| 514,267 | 2/1894 | Legay et al. | 136/74 |
| 622,689 | 4/1899 | Howell | 136/60 |
| 1,447,657 | 3/1923 | Gouin et al. | 136/74 |
| 2,932,680 | 4/1960 | Andre | 136/30 |
| 2,983,777 | 5/1961 | Yardney | 136/20 |

FOREIGN PATENTS OR APPLICATIONS

| 882,206 | 2/1943 | France | 136/130 |

*Primary Examiner*—Anthony Skapars
*Attorney, Agent, or Firm*—Ronald S. Cornell; Israel Nissenbaum; Charles W. Hoffmann

[57] ABSTRACT

A zinc wire coil is wound as a helix on a conducting support such as a copper or brass wire or rod, and the unit amalgamated in a mercuric salt solution to form a rigid anode element; in a cell such anode maintains substantially uniform spacing between anode and cathode to maintain substantially uniform current flow distribution.

Using a multi-strand cable, or multiple layers of zinc wires for the helix permits predetermined percentage ratio of porosity to volume of anode.

7 Claims, 5 Drawing Figures

ELECTRIC CELL WITH ZINC COIL ANODE AND METHOD OF MAKING IT

This is a continuation of application Ser. No. 204,062, filed Dec. 2, 1971, now abandoned.

This invention relates to electric cells, particularly such as use alkaline electrolytes, and the invention is particularly directed to the improvement in the anode structure, which increases the assurance of proper physical disposition of the anode working surface relative to the cathode working surface, and of greater uniformity in the distribution of the operational chemical activity of the cell, by reason of the ability of this improved anode as an electrode in the cell to maintain a substantially uniform radial electric field distribution, axially along its length, with respect to a surrounding and encircling cathode structure, for the operating life of the cell.

In the formation and manufacture of round electric cells of the alkaline electrolyte type, the several components of the cells include generally, an axially disposed anode, a concentric surrounding cathode structure, and appropriate separator or spacer elements, between the anode and the cathode.

A primary problem of importance is the disposition of the anode in an axial position, with some assurance that the anode will remain properly axially disposed and properly effective within the cell, during the operating life of the cell.

In similar cells, another problem that exists is the matter of constructing the anode in such manner as to provide relatively large current conducting surfaces in a small volumetric space of anode material, in order to arrange, as much as possible, field conditions that will lead to an even distribution of elementary current streams, and to prevent concentrations of current at specific casual or accidental favorable conducting regions. The consequence of conditions that would lead to current concentrations at such favorable regions would be to subject those regions of the anode to concentrated non-uniform interchemical reactions and to irregular reduction of the volume of the anode, with consequent weakening and severance of the anode structure before the full energy of the cell has been utilized.

In some anode structures, resort has been taken to provide the anode in the form of a porous structure, in order to provide greater working surface area, with the possibility of greater current distribution and more uniform current density. In this general sense, porosity is intended to define any structural formation of non-regular contour that provides an increase of exposed surface area greater than in a regular figure within the same volumetric space.

A desirable anode structure, particularly for a small electrode cell of the alkaline electrolyte type, is therefore one that will have adequate strength or rigidity to maintain its initially positioned axial disposition; and that will provide an increased surface area for current conduction; and that will have an inherent structural design and disposition that will provide positive self-sustaining strength for the life of the electric cell in which the anode is utilized.

Zinc is an active anode material generally employed for anode use in an electric cell of the alkaline electrolyte type.

For the purpose of the present invention, the anode is constructed as a helical coil wound to encircle a relatively rigid linear current collector element of high conductivity, such as copper or brass, which serves both as a current collector and a rigid support for the helical coil anode element, which consists of a zinc wire or linear element wound around the rigid collector.

The current collector support and the helically wound coil anode are then cut to desired length as a unit, to constitute a single anode element for subsequent disposition and use.

The anode elements thus formed are preferably cleaned before and after winding, and the cut unit pieces are then amalgamated in a solution containing mercuric salts, after which the anodes thus bonded are rinsed and dried and then stored or wrapped for storage, ready for assembling into cells.

Tests made on cells, some constructed with prior type anodes, and some made with anodes according to the present invention, show a continuous discharge of at least 63 hours for cells with present anode structures, as against discharge of 56 hours with old type anodes, both being measured to a bottom terminal voltage of 0.8 volts for testing purposes. Further, in the case of the old anodes, the discharge was not continuous but indicated short interrupted discharges after the first 40 hours, until the 56-hour discharge time was reached.

The construction of a wound-coil anode, illustrated herein for disposition in a small, round, generally elongated electric cell, and a graph showing the discharge curves for electric cells, with anodes of the type disclosed herein in contrast to electric cells with prior anodes, are described in the following specification and illustrated in the accompanying drawings, in which FIG. 1 is a schematic view of the electric cell with a portion broken away to show the internal disposition of the components of the cell;

Figure 1:
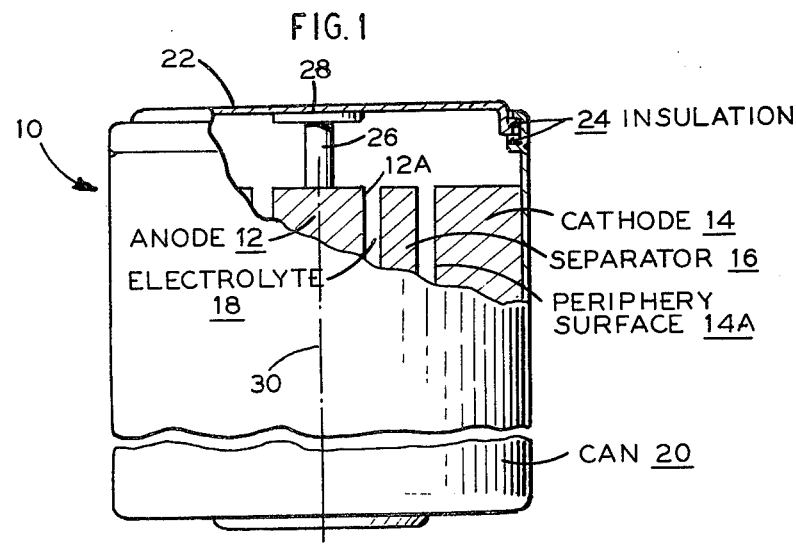

As shown in the drawing, an electric cell 10 comprises an anode structure 12, a cathode structure 14, concentrically surrounding the anode structure 12, and separated therefrom by a suitable porous separator 16 to physically separate the anode 12 and the cathode 14 while permitting ionic transfer through an alkaline electrolyte 18 disposed in the space between the anode 12 and the cathode 14. All the mentioned elements and components are enclosed in a metal can 20, which is closed by a metallic cover 22, which is suitably mounted on and secured to the top originally open end of the can 20 through suitable insulating means 24, which insulate the cover 22 from the metal can 20.

The cover 22 is electrically connected to the anode 12 through a suitable coupling element 26, which for the purpose of this application is merely schematically indicated as an element electrically and physically coupled to the anode 12 and electrically welded at point 28 to the cover 22, which cover serves as an upper electrode for the cell 10. The body of the can 20 serves as an electrode of opposite polarity, and the cell thus provides two terminals, which are here illustrated merely in simplified conventional form, that may then be connected to suitably operating elements of an external circuit in which the cell voltage is to be utilized.

The schematic showing of FIG. 1 serves to illustrate how the problems arise that were previously referred to, that may affect the desired optimum operation of the cell. The spacing between the inner peripheral surface 14A of the cathode material should be concentric with the axis 30, and, similarly, the outer peripheral cylindrical contour surface 12A of the anode 12 should similarly be concentric about the axis 30, in order that the radial spacing between outer peripheral cylindrical virtual surface contour 12A of the anode 12 and the inner peripheral surface 14A of the cathode will be relatively uniform around the anode, and along the length of the anode. Thus, the ionic current paths will be substantially uniform and the chemical activity equally distributed.

In the absence of such uniform spacing between the anode 12 virtual contour and the cathode inner peripheral surface 14A, the current between those two elements will tend to concentrate along any minimum dimension distance lines, and the effect will be to erode the anode in the concentrated activity region where any such dimension exists. By provision of the present invention, a cylindrical virtual contour surface is established which has a greater tendency to maintain the effect of a uniform radial dimension between the anode and the cathode, and thus tends to maintain a substantially uniform current distribution between those two electrodes.

Figure 2A:
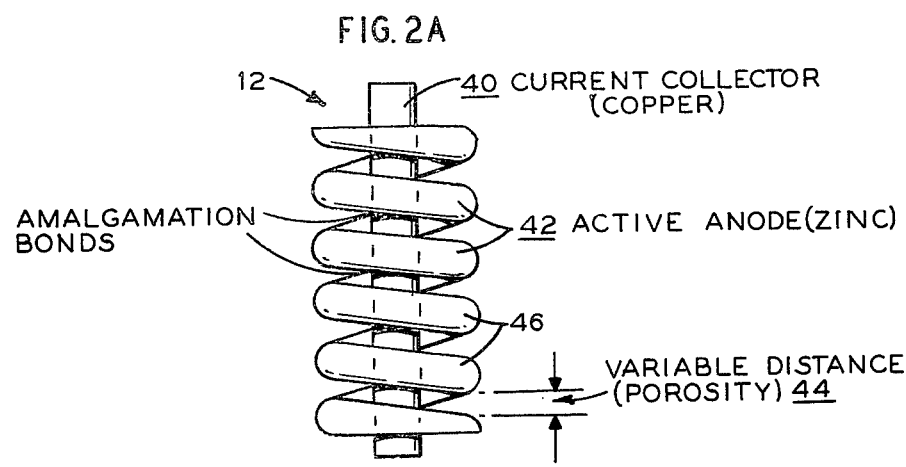
FIG. 2A is a front elevation of a single coil anode.
Figure 2B:
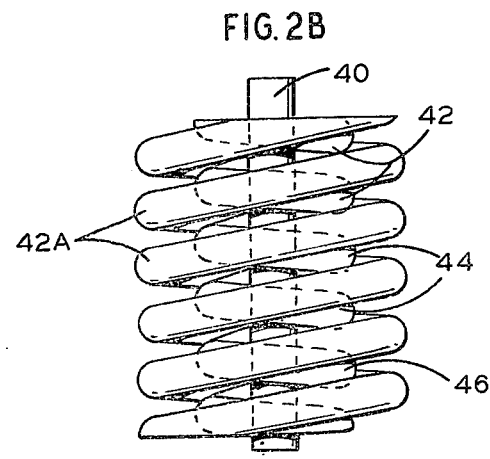
FIG. 2B shows symbolically a superimposed coil which may be a multi-strand cable.

The construction of the anode 12 in accordance with the present invention is shown in FIG. 2. An elongated linear element 40, which is relatively rigid and is formed of a conductor of high electrical activity, such as copper or brass, serves to provide a self-retaining shape about which a zinc wire 42 is wound in helical form, with a pitch that will provide a predetermined spacing 44 between the adjacent surfaces of the convolutions 46. In forming the anode structure 12, as in FIG. 2, the supporting linear element 40 and the wound zinc wire 42 are preferably cleaned before the zinc wire is wound on the support 40, in order to avoid possible trapping or inclusion of any foreign particles between them. After the winding operation, the anode structure is cut to length as desired, and the assemblies thus formed are then cleaned and degreased in an organic solvent or other suitable cleaner, after which the anode structures are dipped into a solution containing mercuric salts to establish an amalgamation between the supporting element 40 and the zinc coil 42 wound on the supporting element 40. The amalgamated units are then rinsed to remove the remnants of the salt solution, and are then suitably dried, and are then properly stored for subsequent use, ready for assembling into electric cells.

Figure 3:
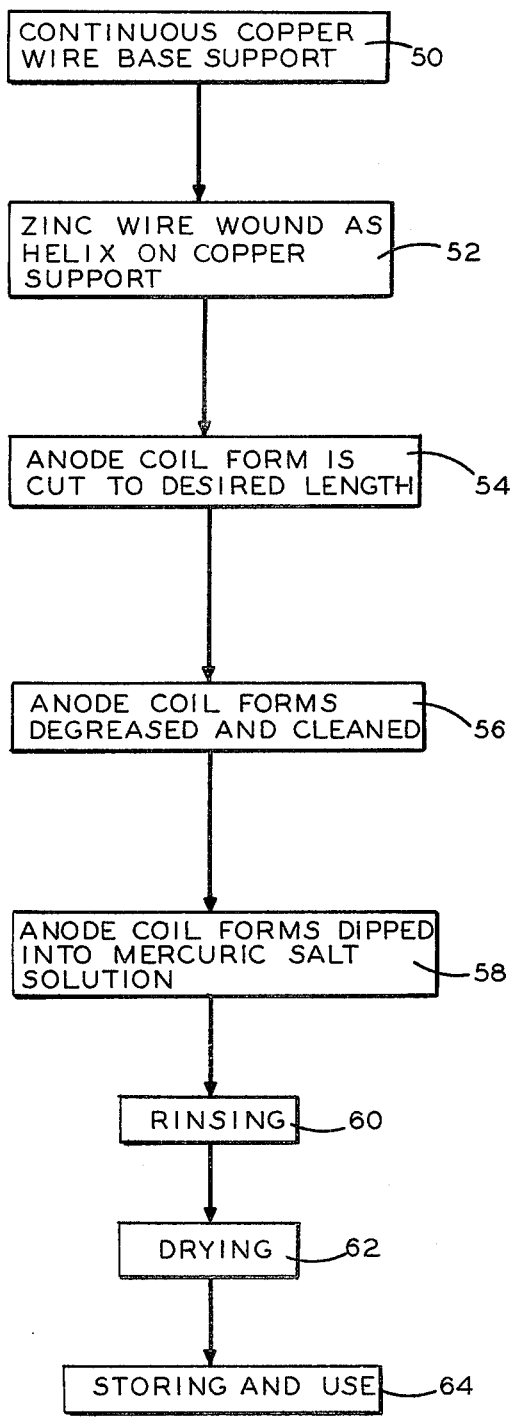
FIG. 3 is a flow chart diagram showing the various steps of preparing the coil anode of the present invention.

The sequence of steps in the method of forming the anode 12 is illustrated in FIG. 3, in which step 50 represents a continuous feed of copper wire as a base support for the anode, upon which the next step is to wind a zinc wire continuously as a helix on the copper support. In step 54 the anode coil form is cut to desired length, as an anode 12. Next, as step 56, the anode coils are then degreased, as previously indicated, in a suitable cleaner, such as an organic solvent or the like. The cleaned and degreased anode elements are then, as step 58, dipped into a solution containing mercuric salts to induce amalgamation between the zinc wire and the copper base, thereby providing a supporting and holding bond between the support 40 and the zinc wire 42. to strengthen the anode 12, and to maintain the convolutions of the helical zinc wire 42 in fixed spaced position, in spite of any chemical interaction in the cell that will react on and corrode the zinc. After the amalgamation, the anodes 12 are rinsed, as step 60, and then dried, as step 62, and then stored as step 64, or placed in suitable hoppers for immediate distribution to the workers or machines for disposition in the assembly of the electric cells in the manufacturing operations.

Figure 4:
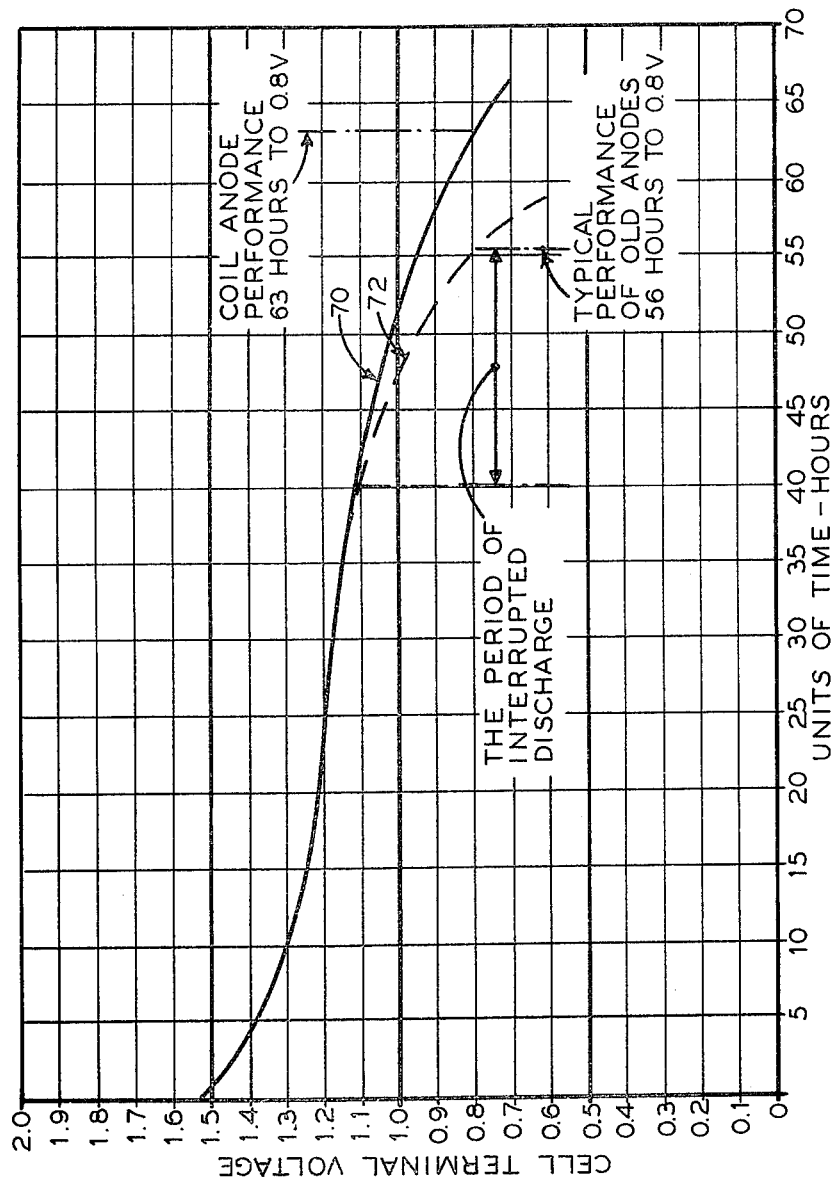
FIG. 4 is a graph showing a discharge curve of a cell employing an anode of the present invention, and a discharge curve of a cell showing a prior type anode.

The benefits of the present invention are illustrated in FIG. 4, in which two graphs 70 and 72 are shown to illustrate the voltage drop of a cell over a period of hours with continuous discharge, according to the structure of the anode. Curve 70 shows the voltage action of a cell provided with the improved anode of this invention, and shows a continuous gradually dropping curve, to 63 hours before dropping to 0.8 volt from a starting voltage of 1.5 volt. Curve 72 shows the voltage curve for a cell having a prior conventional type anode. The voltage dropped much faster after 35 hours, and reached the bottom test voltage of 0.8 voltage after 56 hours, against a longer discharge time of 63 hours for the improved anode of this invention. Further, it was observed during the discharge of cylindrical alkaline cells that cells with prior conventional anodes produced an interrupted discharge curve towards the end of discharge, due to the gradual weakening of the anode structure and of its contact with the current collector or the cell top.

Most of the low porosity anodes are made today of several pieces, the number of pieces depending on the diameter-to-length ratio of the cylindrical cell. This is being done because the zinc powder could not be pressed in long and thin rods with a uniform density along the entire length of the rod. The negative pressure gradient towards the middle of the anode resulted in a negative density gradient and a low strength of the central part of the pressed structure. Attempts were made to overcome the above difficulties by switching from the longitudinal to the radial pressing of the structure, but the attempts were met with enormous practical problems in a high speed production of those structures. Even the apparently successful attempts failed to yield an anode structure that would maintain its structural integrity and a good contact to the current collector through the entire service life of the cell.

The above difficulties have been overcome by making the wire wound anode, as herein, whereby zinc wire is wound around copper or brass wire. The necessary mercury is supplied to the anode by a postamalgamation, using amalgamation in solutions containing mercuric salts.

In operation of the cell, the central copper or brass wire maintains its shape and strength even when most of the zinc wire is oxidized in the discharge process. Mercury moves gradually towards the central part of the anode as the discharge progresses covering the parts of the central wire as they become exposed to the electrolyte.

By means of the present construction of the anode, many advantages are obtained among which may be specifically noted the following.

1. Increased active life of the cells up to 15% at low and moderate discharge rates.

2. Simplified assembling procedure, since the anode is made of one piece, regardless of the diameter-to-length ratio of the cell.
3. Stable structural integrity of the anode regardless of the state of discharge of the cell.
4. Positive anode-to-top contact even at the very end of discharge of the cell.
5. Favorable mercury distribution throughout the entire anode structure.
6. Easy handling on the assembly line, since the anode is much stronger than any comparably shaped anode produced to date.

A certain number of anodes of this type were incorporated into Mallory Mn 2200 cells and tested against the regular cells. The standard test was applied by discharging the cells through a constant load of 127 ohms and measuring the time of service before the cell voltage drops below 1.0 V. The average service life was as follows:

Regular anode cells — 56 hours
New anode cells — 63 hours

It will be realized that the spacing between the convolutions of the zinc wire helix provides essentially a high degree of porosity in the sense that the arcuate surfaces of the convolutions behind the front contour edges constitute equivalent porosity by providing increased current conducting surfaces. By making the zinc anodes with wires of different gauge, and with appropriate winding of the wire in a suitable predetermined winding pattern, as for example, with one layer of wire upon an under layer of wire, a high degree of porosity with respect to volume is available.

In another form of utilization, zinc wires may be arranged into an elongated cable of individual wire strands, with all of the strands of zinc, or with some of zinc and some of nonconducting material, and the cable thus formed wound around the central supporting collector, so that the complete anode will have a different desired pattern of porosity.

A feature of the anode structure disclosed herein is the fact that the current collector, as a support, and the anode wire conductor are joined into an integral part before the mercury is applied to the anode for amalgamation. In fact the basic important feature of the invention is that the zinc wire, with its inherent strength as a cohesive wire element, is used, and can be used as an active material. A further feature, of course, is the making of the anode with the current collector serving as an integral part of the anode structure and providing structural support and strength to the anode, whereby the anode may be handled and positioned in assembly during manufacture, with greater assurance that the anode will remain in its predesignated position, and thereby maintain an optimum physical disposition, relative to the cathode, for an optimum field distribution, to establish a substantial uniformity in current distribution between the cathode and the anode.

It will be obvious from the disclosure that the distribution and mounting of the anode wire as a single element or as multiplicity of elements on the supporting current collector may be modified in various ways and in various patterns without departing from the spirit and scope of the invention as set forth in the claims.

What is claimed is:
1. An alkaline electric cell comprising an anode embodying a helically wound zinc filamentary element surrounding and supported on a linear, elongated conductor of high electrical conductivity, said element being bonded to said conductor by amalgamation of mercury.
2. A zinc metal anode for use in an electric cell comprising a helically wound zinc filament or wire bonded to a supporting current collector by amalgamation with mercury.
3. A zinc metal anode, as in claim 2, in which said helically wound zinc filament or wire is covered by an overlay of wound multiple strands of linear zinc elements.
4. A cylindrical electric cell comprising an anode embodying a helically wound zinc filament or wire supported on a linear conductor of high electrical conductivity the outer peripheral surface of said anode having a cylindrical contour, and a cathode concentrically surrounding said anode and having an inner peripheral surface, there being a substantially uniform radial spacing between outer peripheral surface of the anode and the inner peripheral surface of the cathode.
5. A cylindrical alkaline electric cell comprising an anode embodying a helically wound zinc filament or wire supported on a rigid linear conductor of high electrical conductivity, and a cathode structure surrounding and encircling said anode such that a substantially uniform radial electric field distribution is maintained axially along the length of said anode with respect to said cathode.
6. A cylindrical alkaline electrolyte cell as in claim 5 wherein said helically wound zinc anode element is covered by an overlay of a wound zinc linear element.
7. A cylindrical alkaline electrolyte cell as in claim 5 wherein said helically wound zinc anode element is covered by an overlay of wound multiple strands of linear zinc elements.

* * * * *